United States Patent
Shimada et al.

(10) Patent No.: US 9,455,086 B2
(45) Date of Patent: Sep. 27, 2016

(54) LAMINATED CERAMIC ELECTRONIC COMPONENT

(71) Applicant: Murata Manufacturing Co., Ltd., Nagaokakyo-shi, Kyoto-fu (JP)

(72) Inventors: Yasuyuki Shimada, Nagaokakyo (JP); Takashi Sawada, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 442 days.

(21) Appl. No.: 13/936,402

(22) Filed: Jul. 8, 2013

(65) Prior Publication Data

US 2014/0029159 A1    Jan. 30, 2014

(30) Foreign Application Priority Data

Jul. 26, 2012 (JP) ................... 2012-165438

(51) Int. Cl.
*H01G 4/005* (2006.01)
*H01G 4/30* (2006.01)
*H01G 4/232* (2006.01)

(52) U.S. Cl.
CPC .............. *H01G 4/005* (2013.01); *H01G 4/232* (2013.01); *H01G 4/30* (2013.01)

(58) Field of Classification Search
CPC ......... H01G 4/005; H01G 4/232; H01G 4/30
See application file for complete search history.

(56) References Cited

U.S. PATENT DOCUMENTS

| | | |
|---|---|---|
| 6,445,593 B1 | 9/2002 | Okuyama |
| 2001/0013602 A1 | 8/2001 | Nakagawa et al. |
| 2003/0011962 A1* | 1/2003 | Yamamoto ............... H01G 4/30 361/321.2 |
| 2011/0205684 A1* | 8/2011 | Yamamoto ............. H01G 4/232 361/305 |
| 2012/0188684 A1* | 7/2012 | Akazawa ............... H01G 4/012 361/321.2 |
| 2012/0320495 A1* | 12/2012 | Akazawa ................ H01G 4/30 361/321.2 |

FOREIGN PATENT DOCUMENTS

| | | | |
|---|---|---|---|
| JP | 04154102 A | * | 5/1992 |
| JP | 11-45837 A | | 2/1999 |
| JP | 2001-057311 A | | 2/2001 |
| JP | 2004-235377 A | | 8/2004 |
| JP | 2006-100451 A | | 4/2006 |
| JP | 2010080751 A | * | 4/2010 |

OTHER PUBLICATIONS

Official Communication issued in corresponding Korean Patent Application No. 10-2013-0087957, mailed on Jul. 7, 2014.

* cited by examiner

*Primary Examiner* — David M Sinclair
(74) *Attorney, Agent, or Firm* — Keating & Bennett, LLP (57) ABSTRACT

In a laminated ceramic electronic component, a side-surface outer electrode includes a first electrode portion including side-surface electrode portions located on first and second side surfaces and wrap-around electrode portions arranged to extend around from the side-surface electrode portions of the first electrode portion to portions of third and fourth side surfaces; and a second electrode portion including side-surface electrode portions located on the third and fourth side surfaces and wrap-around electrode portions arranged to extend around from the side-surface electrode portions of the second electrode portion to portions of the first and second side surfaces. The wrap-around electrode portions of the second electrode portion reach regions covering portions of outermost inner electrodes located at an outermost side portion among inner electrodes, which portions are exposed in the first and second side surfaces.

5 Claims, 6 Drawing Sheets

LAMINATED CERAMIC ELECTRONIC COMPONENT

BACKGROUND OF THE INVENTION

1. Field of the Invention

The present invention relates to a laminated ceramic electronic component such as a laminated ceramic capacitor and a method for manufacturing the same.

2. Description of the Related Art

A typical laminated ceramic electronic component is a laminated ceramic capacitor. A laminated ceramic capacitor includes a substantially strip-shaped outer electrode formed on a side surface of a ceramic element assembly.

For example, Japanese Unexamined Patent Application Publication No. 2001-57311 discloses a chip-shaped three-terminal capacitor having a structure in which a pair of end-surface outer electrodes (e.g., terminal electrodes for signal transmission and reception) and a substantially strip-shaped side-surface outer electrode (e.g., a terminal electrode for ground) are provided on an outer surface of a capacitor body (ceramic element assembly) (see, for example, claim 1, FIG. 1, and related description in Japanese Unexamined Patent Application Publication No. 2001-57311).

In addition, as a method for forming the substantially strip-shaped side-surface outer electrode, a method is disclosed in which a conductive paste is applied to a side surface of the ceramic element assembly and fired (see, for example, paragraphs [0053], [0067], [0068], and the like of Japanese Unexamined Patent Application Publication No. 2001-57311).

Figure 6:
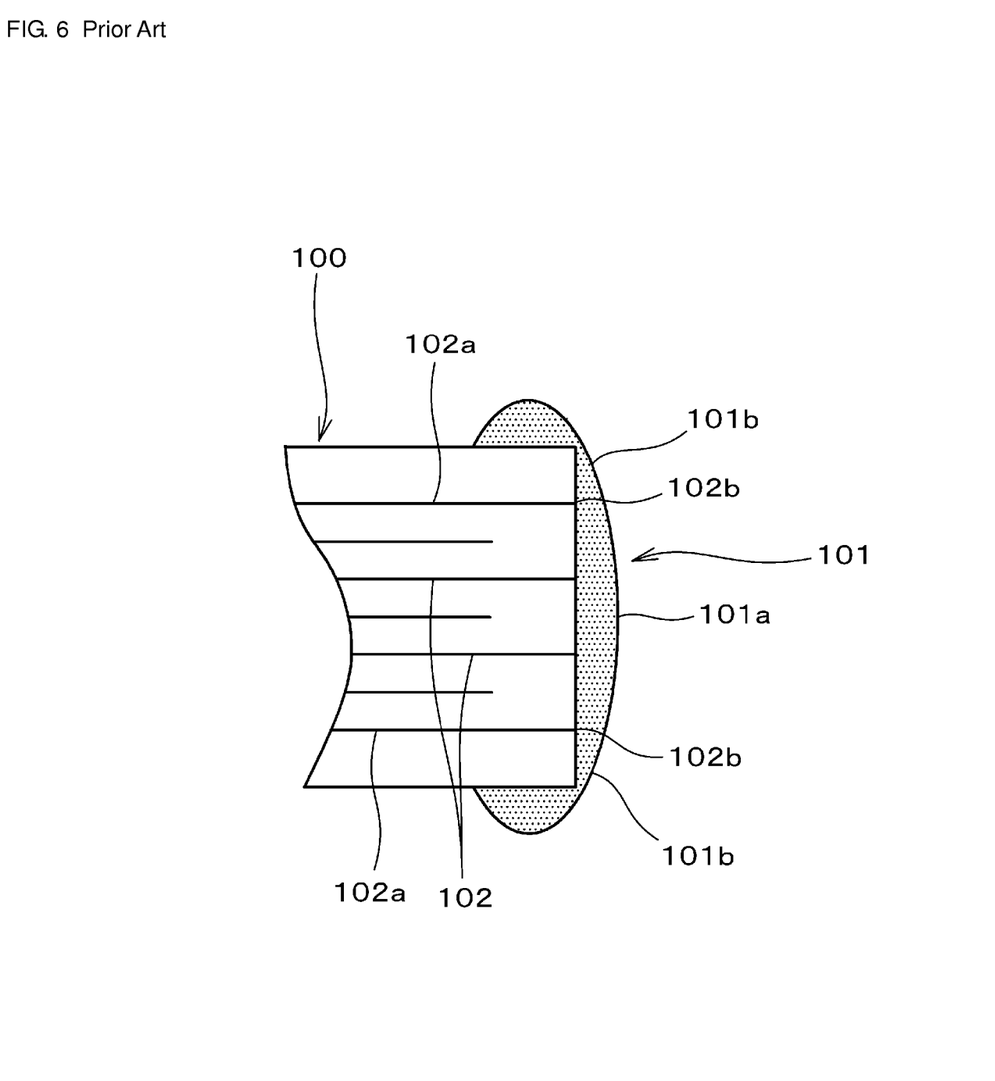
FIG. 6 is a diagram for explaining a problem of an existing laminated ceramic electronic component.

However, when the conductive paste is applied, due to influence of rheology of the conductive paste, for example, a side-surface outer electrode 101 is shaped such that a center portion 101a in a lamination direction is raised and thick and end portions 101b in the lamination direction are thin as schematically shown in FIG. 6, and the thickness of the side-surface outer electrode 101 in regions covering portions 102b of uppermost and lowermost inner electrodes (outermost inner electrodes) 102a in the lamination direction among a plurality of inner electrodes 102, which portions 102b are exposed in a side surface of a capacitor body (ceramic element assembly) 100, tends to be insufficient. In particular, when it is attempted to decrease the entire thickness of the side-surface outer electrode with respect to the size of the ceramic element assembly in order to increase the proportion of obtained electrostatic capacity with respect to the volume of a component (laminated ceramic capacitor), the thickness of the side-surface outer electrode 101 is further decreased at the end portions in the lamination direction. Thus, water infiltrates through the thin portions of the side-surface outer electrode 101, and moisture resistance reliability is decreased.

SUMMARY OF THE INVENTION

Accordingly, preferred embodiments of the present invention provide a laminated ceramic electronic component that prevents or significantly reduces infiltration of water into a ceramic element assembly without causing an increase in the product dimension by increasing an entire thickness of an outer electrode, has high moisture resistance reliability, and has high flexibility in capacitance designing; and a method for manufacturing the same.

A first laminated ceramic electronic component according to a preferred embodiment of the present invention includes a ceramic element assembly including a plurality of laminated ceramic layers and including first and second end surfaces opposed to each other, first and second side surfaces which connect the first and second end surfaces and are opposed to each other, and third and fourth side surfaces which connect the first and second end surfaces and are opposed to each other; a plurality of inner electrodes provided within the ceramic element assembly and extended to the first and second side surfaces; and a strip-shaped side-surface outer electrode provided on the first, second, third and fourth side surfaces of the ceramic element assembly so as to extend around the ceramic element assembly and connected to the inner electrodes extended to the first and second side surfaces. The side-surface outer electrode extending around the ceramic element assembly includes a first electrode portion including side-surface electrode portions located on the first and second side surfaces of the ceramic element assembly and wrap-around electrode portions arranged so as to extend around from the side-surface electrode portions of the first electrode portion to portions of the third and fourth side surfaces; and a second electrode portion including side-surface electrode portions located on the third and fourth side surfaces and wrap-around electrode portions arranged so as to extend around from the side-surface electrode portions of the second electrode portion to portions of the first and second side surfaces. The wrap-around electrode portions of the second electrode portion are arranged so as to reach regions covering portions of outermost inner electrodes located at an outermost side portion among the inner electrodes, which portions are exposed in the first and second side surfaces of the ceramic element assembly.

In the description of preferred embodiments of the present invention, the wrap-around electrode portions of the second electrode portion being "arranged so as to reach regions covering portions of outermost inner electrodes . . . , which portions are exposed in the first and second side surfaces of the ceramic element assembly . . . " indicates that when the exposed portions are already covered with the first electrode portion, the wrap-around electrode portions of the second electrode portion are arranged so as to reach the regions covering the portions exposed in the first and second side surfaces, via the first electrode portion, and also indicates that when the second electrode portion is formed prior to the first electrode portion, the wrap-around electrode portions of the second electrode portion are arranged so as to directly cover the portions of the outermost inner electrodes which are exposed in the first and second side surfaces.

In a laminated ceramic electronic component according to a preferred embodiment of the present invention, in order to ensure a sufficient thickness of the side-surface outer electrode at an end portion where the thickness of the side-surface outer electrode tends to be small (i.e., the portions covering the exposed portions of the outermost inner electrodes), the wrap-around electrode portions of the second electrode portion are arranged so as to reach the regions covering the exposed portions of the outermost inner electrodes which are exposed in the first and second side surfaces of the ceramic element assembly. Thus, it is possible to provide a laminated ceramic electronic component that is able to prevent or significantly reduce infiltration of water into the ceramic element assembly without causing an increase in the product dimension by increasing the entire thickness of the outer electrode, has high moisture resistance reliability, and has high flexibility in capacitance designing.

In addition, a second laminated ceramic electronic component according to another preferred embodiment of the present invention includes a ceramic element assembly including a plurality of laminated ceramic layers and including first and second end surfaces opposed to each other, first and second side surfaces which connect the first and second end surfaces and are opposed to each other, and third and fourth side surfaces which connect the first and second end surfaces and are opposed to each other; a plurality of inner electrodes provided within the ceramic element assembly and extended to the first and second side surfaces; and a strip-shaped side-surface outer electrode located on the first and second side surfaces of the ceramic element assembly and connected to the inner electrodes extended to the first and second side surfaces. The side-surface outer electrode is an electrode whose regions covering portions of outermost inner electrodes located at an outermost side portion among the plurality of inner electrodes extended to the first and second side surfaces, which portions are exposed in the first and second side surfaces of the ceramic element assembly, are formed by firing conductive paste films that are applied twice.

Also in the second laminated ceramic electronic component according to a preferred embodiment of the present invention, it is possible to obtain the same advantageous effects as those described above in the first laminated ceramic electronic component according to a preferred embodiment of the present invention.

In addition, a third laminated ceramic electronic component according to yet a further preferred embodiment of the present invention includes a ceramic element assembly including a plurality of laminated ceramic layers and including first and second end surfaces opposed to each other, first and second side surfaces which connect the first and second end surfaces and are opposed to each other, and third and fourth side surfaces which connect the first and second end surfaces and are opposed to each other; a plurality of inner electrodes provided within the ceramic element assembly and extended to the first and second side surfaces; and a strip-shaped side-surface outer electrode located on the first and second side surfaces of the ceramic element assembly and connected to the inner electrodes extended to the first and second side surfaces. The side-surface outer electrode is arranged such that regions thereof covering portions of outermost inner electrodes located at an outermost side portion among the plurality of inner electrodes extended to the first and second side surfaces, which portions are exposed in the first and second side surfaces of the ceramic element assembly, are not thinner than a thinnest portion of each of regions thereof covering portions of the other inner electrodes which are exposed in the first and second side surfaces of the ceramic element assembly.

Also in the third laminated ceramic electronic component according to a preferred embodiment of the present invention, it is possible to obtain the same advantageous effects as those described above in the first laminated ceramic electronic component according to a preferred embodiment of the present invention. In other words, by enhancing moisture resistance in the regions covering the exposed portions of the outermost inner electrodes where the moisture resistance reliability tends to be the lowest, the moisture resistance reliability is increased and it is possible to obtain a laminated ceramic electronic component having high reliability.

In addition, in the first laminated ceramic electronic component according to a preferred embodiment of the present invention, the wrap-around electrode portions of the second electrode portion are preferably located on the side-surface electrode portions of the first electrode portion.

Since the wrap-around electrode portions of the second electrode portion are located on the side-surface electrode portions of the first electrode portion including the side-surface electrode portions located on the first and second side surfaces and the wrap-around electrode portions arranged so as to extend around to the portions of the third and fourth side surfaces, the wrap-around electrode portions of the second electrode portion are arranged so as to reach the regions covering the portions of the outermost inner electrodes which are exposed in the first and second side surfaces, in a state where the portions of the inner electrodes which are exposed in the side surfaces of the ceramic element assembly are integrally covered by the side-surface electrode portions of the first electrode portion. Thus, it is possible to provide a laminated ceramic electronic component having higher moisture resistance reliability and high reliability of connection between the side-surface outer electrode and each inner electrode, which is meaningful.

In addition, in the first laminated ceramic electronic component according to a preferred embodiment of the present invention, a width of a narrowest portion of the side-surface outer electrode on the first and second side surfaces of the ceramic element assembly is preferably larger than a width of a narrowest portion of the side-surface outer electrode on the third and fourth side surfaces of the ceramic element assembly.

Since the width of the narrowest portion of the first electrode portion A which voluntarily serves to cover the portions of the inner electrodes which are exposed in the side surfaces of the ceramic element assembly is larger than the width of the narrowest portion of the second electrode portion B, it is possible to provide a laminated ceramic electronic component that is able to more reliably prevent or significantly reduce infiltration of water into the ceramic element assembly and has high moisture resistance reliability, which is meaningful.

In addition, each laminated ceramic electronic component according to the various preferred embodiments of the present invention, the ceramic element assembly preferably has a quadrangular prism shape in which each of the first and second end surfaces is a square, for example.

Since the ceramic element assembly preferably has a quadrangular prism shape in which each of the first and second end surfaces is a square, it is possible to obtain a laminated ceramic electronic component having no directivity in the side surfaces of the ceramic element assembly, and it is possible to handle the laminated ceramic electronic component without regard to its direction at a time of taping package or mounting.

In the description of preferred embodiments of the present invention, the phrase "each of the first and second end surfaces is a square" is not limited to a case where each of the first and second end surfaces is literally a square, but is also a concept of including a case of being substantially a square due to manufacturing tolerances or the like.

In addition, each laminated ceramic electronic component according to the preferred embodiments of the present invention preferably further includes a plurality of inner electrodes provided within the ceramic element assembly and extended to the first and second end surfaces, in addition to the inner electrodes extended to the first and second side surfaces; and end-surface outer electrodes located on the first and second end surfaces of the ceramic element assembly and connected to the inner electrodes extended to the first and second end surfaces, in addition to the side-surface outer electrode.

Since the above-described configuration is provided, it is possible to obtain a three-terminal capacitor having a structure including a pair of end-surface outer electrodes (e.g., terminal electrodes for signal transmission or reception) and a strip-shaped side-surface outer electrode (e.g., a terminal electrode for ground) on the surface of the ceramic element assembly, which is meaningful.

In addition, a method for manufacturing a laminated ceramic electronic component according to a further preferred embodiment of the present invention is a method for manufacturing a laminated ceramic electronic component including a ceramic element assembly including a plurality of laminated ceramic layers and including first and second end surfaces opposed to each other, first and second side surfaces which connect the first and second end surfaces and are opposed to each other, and third and fourth side surfaces which connect the first and second end surfaces and are opposed to each other; a plurality of inner electrodes provided within the ceramic element assembly and extended to the first and second side surfaces; and a strip-shaped side-surface outer electrode located on the first and second side surfaces of the ceramic element assembly and connected to the inner electrodes extended to the first and second side surfaces. The method includes a step of forming the side-surface outer electrode, the step including a first application step of applying a conductive paste to portions of the first and second side surfaces of the ceramic element assembly into a strip shape such that the conductive paste extends from one end side to another end side in a lamination direction; and a second application step of applying a conductive paste to regions covering portions of outermost inner electrodes located at an outermost side portion among the inner electrodes, which portions are exposed in the first and second side surfaces of the ceramic element assembly, without applying the conductive paste to a center portion in the lamination direction.

Since, in the method for manufacturing the laminated ceramic electronic component according to a preferred embodiment of the present invention, the step of forming the side-surface outer electrode includes the first application step of applying the conductive paste to the portions of the first and second side surfaces of the ceramic element assembly into a strip shape such that the conductive paste extends from one end side to another end side in the lamination direction; and the second application step of applying the conductive paste to the regions covering the portions of outermost inner electrodes located at an outermost side portion among the inner electrodes, which portions are exposed in the first and second side surfaces of the ceramic element assembly, without applying the conductive paste to the center portion in the lamination direction as described above, it is possible to ensure a sufficient thickness of the side-surface outer electrode at an end portion where the thickness of the side-surface outer electrode tends to be small (portions covering the exposed portions of the outermost inner electrodes). As a result, it is possible to prevent or significantly reduce infiltration of water into the ceramic element assembly without excessively increasing the entire thickness of the outer electrode. Accordingly, it is possible to efficiently manufacture a laminated ceramic electronic component that is able to achieve both desired flexibility in capacitance designing and high moisture resistance reliability.

In addition, in the method for manufacturing the laminated ceramic electronic component according to a preferred embodiment of the present invention, the second application step is preferably a step of applying the conductive paste to the third and fourth side surfaces such that the conductive paste extends around from the third and fourth side surfaces to the first and second side surfaces to form wrap-around electrode portions extending around to the first and second side surfaces.

Since, in the second application step, the conductive paste is applied to the third and fourth side surfaces such that the wrap-around electrode portions are formed on the first and second side surfaces, the conductive paste is efficiently applied to the regions covering the portions of the outermost inner electrodes which are exposed in the first and second side surfaces of the ceramic element assembly, such that it is possible to form a side-surface outer electrode that is able to prevent or significantly reduce infiltration of water into the ceramic element assembly without excessively increasing the entire thickness of the outer electrode, which allows various preferred embodiments of the present invention to be made more effective.

In addition, in the method for manufacturing the laminated ceramic electronic component according to a preferred embodiments of the present invention, the second application step is preferably conducted after the first application step is conducted.

Since the second application step is preferably conducted after the first application step is conducted, a conductive paste pattern (a conductive paste pattern that is to be the second electrode portion after firing) formed by the second application step is formed so as to reach the regions covering the portions of the outermost inner electrodes which are exposed in the first and second side surfaces, in a state where the portions of the inner electrodes which are exposed in the side surfaces of the ceramic element assembly are integrally covered by a conductive paste pattern (a conductive paste pattern that is to be the first electrode portion after firing) formed by the first application step. Thus, by subsequently conducting a firing step, it is possible to reliably manufacture a laminated ceramic electronic component having higher moisture resistance reliability and high reliability of connection between the side-surface outer electrode and each inner electrode.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described and the features of various preferred embodiments of the present invention will be described in more detail.

Figure 1:
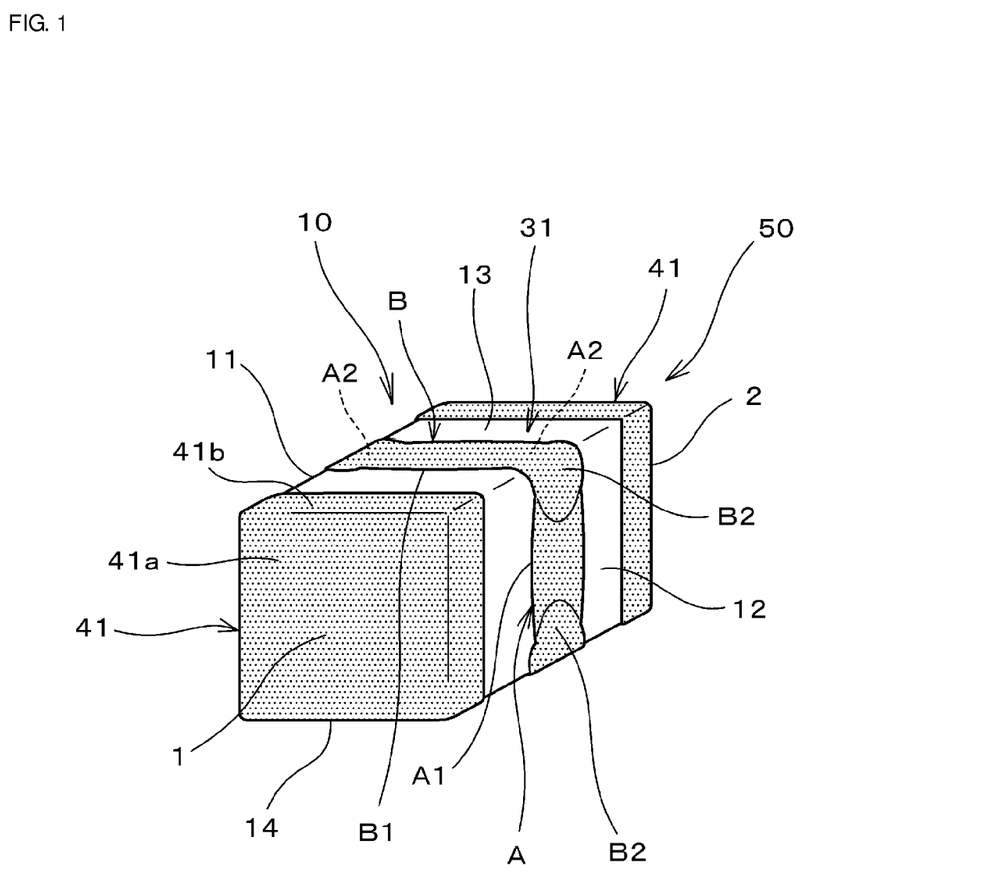
FIG. 1 is a perspective view of a laminated ceramic capacitor according to a preferred embodiment of the present invention.
Figure 2:
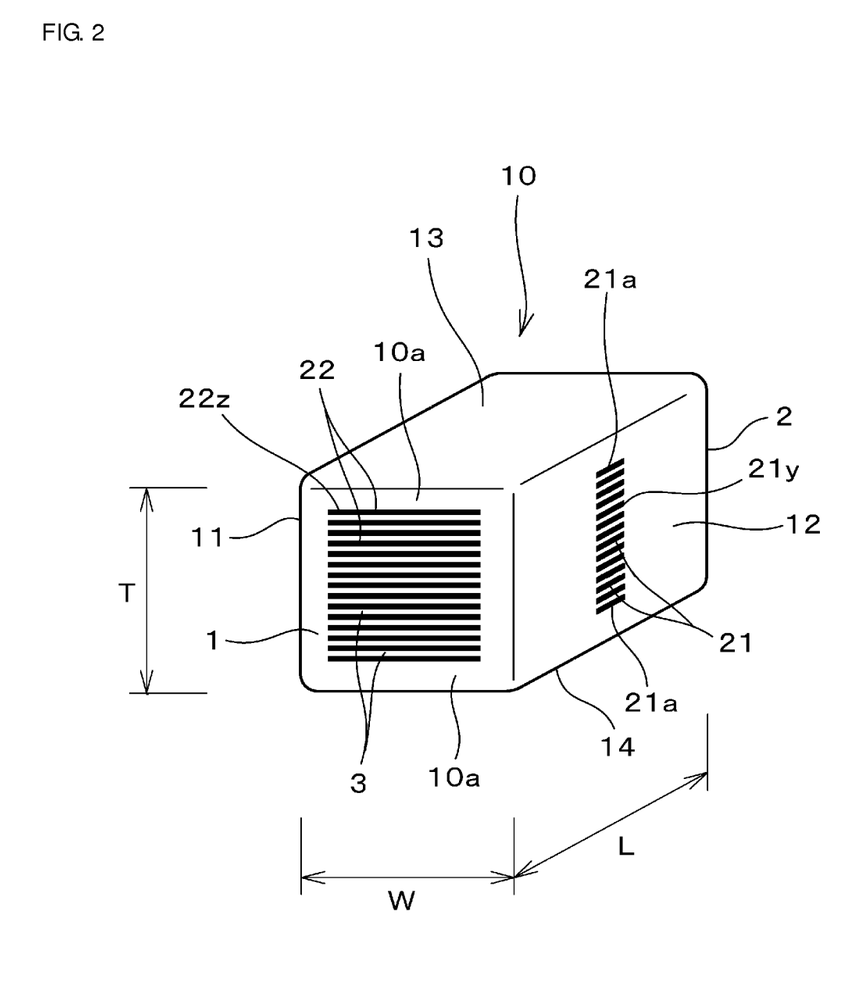
FIG. 2 is a perspective view of a ceramic element assembly constituting the laminated ceramic capacitor according to a preferred embodiment of the present invention.
Figure 3:
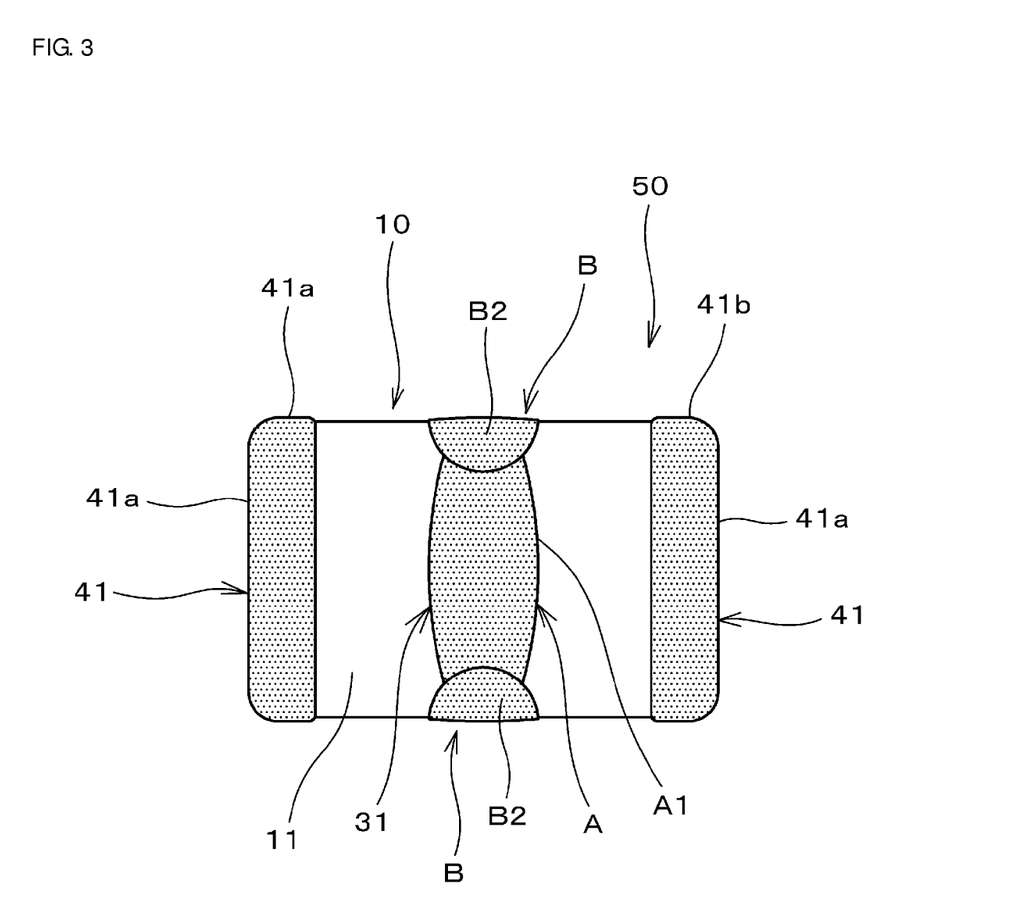
FIG. 3 is a diagram of the laminated ceramic capacitor according to a preferred embodiment of the present invention, as seen from a first side surface side.

FIG. 1 is a perspective view showing the configuration of a laminated ceramic electronic component (for example, a three-terminal laminated ceramic capacitor) according to a preferred embodiment of the present invention, FIG. 2 is a perspective view showing the configuration of a ceramic element assembly constituting the laminated ceramic capacitor, and FIG. 3 is a diagram of the laminated ceramic capacitor according to the present preferred embodiment of the present invention, as seen from a first side surface side.

The laminated ceramic capacitor 50 includes a ceramic element assembly 10 that is formed preferably by laminating a plurality of ceramic layers 3 and that includes a first end surface 1 and a second end surface 2 which are opposed to each other, a first side surface 11 and a second side surface 12 which connect the first and second end surfaces 1 and 2 and are opposed to each other, and a third side surface 13 and a fourth side surface 14 which connect the first and second end surfaces 1 and 2 and are opposed to each other.

Figure 4A:
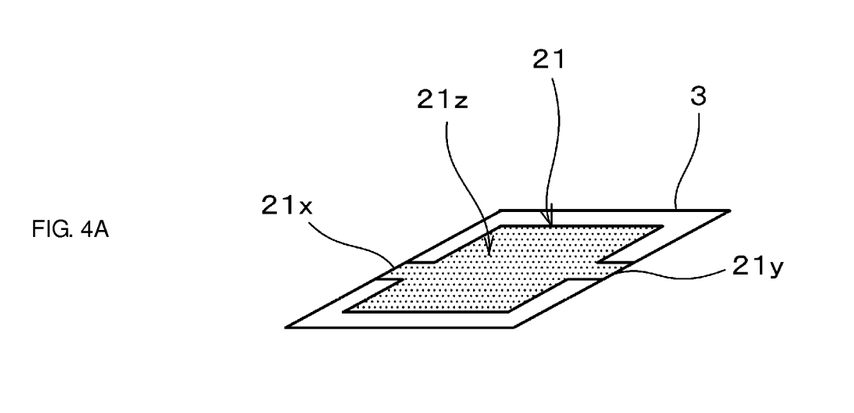
FIG. 4A is a diagram showing the structure of an inner electrode of the laminated ceramic capacitor according to a preferred embodiment of the present invention, the inner electrode being extended to side surfaces of the ceramic element assembly.
Figure 4B:
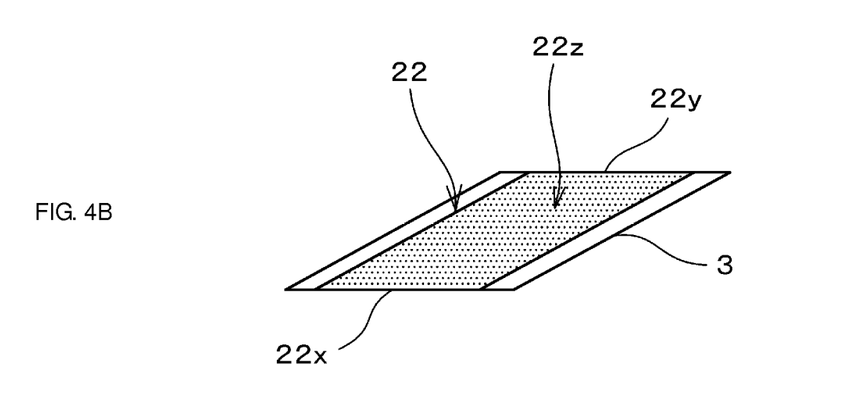
FIG. 4B is a diagram showing the structure of an inner electrode of the laminated ceramic capacitor according to a preferred embodiment of the present invention, the inner electrode being extended to end surfaces of the ceramic element assembly.

Within the ceramic element assembly 10, a plurality of first inner electrodes (side-surface extended inner electrodes) 21 are arranged which have a substantially cross planar shape and of which a pair of opposed end portions 21x and 21y are extended to the first and second side surfaces 11 and 12 as shown in FIG. 4A. In addition, within the ceramic element assembly 10, a plurality of second inner electrodes (end-surface extended inner electrodes) 22 are arranged to face the first inner electrodes (side-surface extended inner electrodes) 21 across the ceramic layers 3 and of which a pair of opposed end portions 22x and 22y are extended to the first and second end surfaces 1 and 2 as shown in FIG. 4B.

The laminated ceramic capacitor 50 includes a substantially strip-shaped side-surface outer electrode 31 that is located on the first, second, third, and fourth side surfaces 11, 12, 13, and 14 of the ceramic element assembly 10 so as to extend around the ceramic element assembly 10 and is connected to the first inner electrodes (side-surface extended inner electrodes) 21, which are extended to the first and second side surfaces 11 and 12.

The laminated ceramic capacitor 50 also includes end-surface outer electrodes 41 that are located on the first and second end surfaces 1 and 2 of the ceramic element assembly 10 and are connected to the second inner electrodes (end-surface extended inner electrodes) 22, which are extended to the first and second end surfaces 1 and 2.

Furthermore, the side-surface outer electrode 31 includes a first electrode portion A including side-surface electrode portions A1 located on the first and second side surfaces 11 and 12 and wrap-around electrode portions A2 arranged so as to extend around from the side-surface electrode portions A1 to portions of the third and fourth side surfaces 13 and 14; and a second electrode portion B including side-surface electrode portions B1 located on the third and fourth side surfaces 13 and 14 and wrap-around electrode portions B2 arranged so as to extend around from the side-surface electrode portions B1 to portions of the first and second side surfaces 11 and 12.

The wrap-around electrode portions B2 of the second electrode portion B are arranged so as to reach regions covering portions of outermost inner electrodes 21a located at the outermost side portion among the plurality of first inner electrodes (side-surface extended inner electrodes) 21, which portions are exposed in the first and second side surfaces 11 and 12 of the ceramic element assembly 10.

Hereinafter, the laminated ceramic electronic component (laminated ceramic capacitor) according to the present preferred embodiment of the present invention will be described in further detail.

As described above, the ceramic element assembly 10 constituting the laminated ceramic capacitor 50 according to the preferred embodiment is formed preferably by laminating the plurality of ceramic layers 3 and includes the first end surface 1 and the second end surface 2 which are opposed to each other, the first side surface 11 and the second side surface 12 which connect the first and second end surfaces 1 and 2 and are opposed to each other, and the third side surface 13 and the fourth side surface 14 which connect the first and second end surfaces 1 and 2 and are opposed to each other.

The ceramic element assembly 10 preferably has a substantially quadrangular prism shape (a substantially rectangular parallelepiped shape) in which the first and second end surfaces 11 and 12 are substantially squares. The corner portions and edge portions of the ceramic element assembly 10 are chamfered so as to be rounded.

Here, as shown in FIG. 2, where the distance (length) between the first and second end surfaces 1 and 2 is defined as L; the direction of this length L is defined as an L direction; the distance (width) between the first and second side surfaces 11 and 12 is defined as W; the direction of this width W is defined as a W direction; the distance (thickness) between the third and fourth side surfaces 13 and 14 is defined as T; and the direction of this thickness T is defined as a T direction, the ceramic element assembly 10 has a lamination structure including the plurality of ceramic layers 3 which extend in the W direction and the L direction and are laminated in the T direction.

It should be noted that the ceramic element assembly 10 preferably has a substantially prism structure in which the lengths in the W direction and the T direction (i.e., the width W and the thickness T) are substantially the same and the first and second end surfaces 1 and 2 are substantially squares.

The thickness of each ceramic layer 3 is preferably about 0.5 μm to about 10 μm, for example.

For example, dielectric ceramic materials such as $BaTiO_3$, $CaTiO_3$, $SrTiO_3$, and $CaZrO_3$ may be used as the ceramic material of the ceramic layers 3. In addition, materials obtained by adding accessory components such as Mn compounds, Mg compounds, Si compounds, Co compounds, Ni compounds, and rare-earth element compounds to principal components that are these materials may also be used, for example.

As described above, the laminated ceramic capacitor 50 according to the present preferred embodiment includes, as inner electrodes, the plurality of first inner electrodes (side-surface extended inner electrodes) 21 extended to the first and second side surfaces 11 and 12 and the plurality of second inner electrodes (end-surface extended inner electrodes) 22 extended to the first and second end surfaces 1 and 2.

The plurality of first inner electrodes (side-surface extended inner electrodes) 21 and the plurality of second inner electrodes (end-surface extended inner electrodes) 22 are alternately laminated (arranged) via the ceramic layers 3 in a lamination direction of the ceramic element assembly 10, namely, in the T direction.

In the laminated ceramic capacitor 50 according to the present preferred embodiment, the first inner electrodes (side-surface extended inner electrodes) 21 are configured to serve as electrodes for ground.

Each first inner electrode 21 preferably has a substantially cross planar shape as shown in FIG. 4A and is configured such that its center portion serves as an opposing portion 21z that faces an opposing portion 22z of each second inner electrode 22 adjacent thereto across the ceramic layer 3.

In addition, a pair of the opposed end portions 21x and 21y of each first inner electrode (side-surface extended inner electrode) 21 are exposed in the first and second side surfaces 11 and 12, respectively, of the ceramic element assembly 10. In other words, each first inner electrode 21 is arranged so as to extend from the first side surface 11 to the second side surface 12.

In the laminated ceramic capacitor 50 according to the present preferred embodiment, the second inner electrodes (end-surface extended inner electrodes) 22 are configured so as to serve as electrodes for signal transmission and reception.

Each second inner electrode 22 preferably has a substantially wide-strip shape as shown in FIG. 4B, and a pair of the opposed end portions 22x and 22y thereof are exposed in the first and second end surfaces 1 and 2, respectively, of the ceramic element assembly 10. In other words, each second inner electrode 22 is arranged so as to extend from the first end surface 1 to the second end surface 2.

Each second inner electrode (end-surface extended inner electrode) 22 is configured such that its center portion serves as the opposing portion 22z that faces the opposing portion 21z of each first inner electrode 21 adjacent thereto across the ceramic layer 3.

For example, Ni, Cu, Ag, Pd, an Ag—Pd alloy, Au, and the like may be used as the conductive materials of the first and second inner electrodes 21 and 22.

In addition, each of the thicknesses of the first and second inner electrodes 21 and 22 is preferably about 0.3 μm to about 2.0 μm, for example.

In the laminated ceramic capacitor 50 according to the present preferred embodiment, electrostatic capacity occurs in a region where the opposing portion 21z of each first inner electrode 21 and the opposing portion 22z of each second inner electrode 22 face each other across the ceramic layer 3. In the present preferred embodiment, the region where the electrostatic capacity occurs is defined as an effective portion.

Meanwhile, an outer side portion region where no first inner electrode 21 and no second inner electrode 22 are present along the lamination direction of the ceramic layers 3 is defined as an outer layer portion.

In the laminated ceramic capacitor 50 according to the present preferred embodiment, an outer layer portion 10a is present on each of the third side surface 13 side and the fourth side surface 14 side of the ceramic element assembly 10 (see FIG. 2).

It should be noted that the thickness (the dimension along the T direction) of each outer layer portion 10a is preferably equal to but may be thinner than the dimension (gap dimension) along the W direction from each of the first and second side surfaces 11 and 12 of the ceramic element assembly 10 to each second inner electrode 22. On the other hand, if the thickness of each outer layer portion 10a becomes excessively large, the size of a product is undesirably increased. Thus, in the laminated ceramic capacitor 50 according to the present preferred embodiment, the thickness of each outer layer portion 10a is preferably equal to or less than about 60 μm, for example.

As described above, the laminated ceramic electronic component according to the present preferred embodiment includes, as outer electrodes, the side-surface outer electrode 31 located on the first and second side surfaces 11 and 12 and the end-surface outer electrodes 41 located on the first and second end surfaces 1 and 2.

The side-surface outer electrode 31 and the end-surface outer electrodes 41 are connected to different potentials.

Each of the side-surface outer electrode 31 and the end-surface outer electrodes 41 preferably has a configuration including a base layer (outer electrode body) and a plating layer located thereon.

In the present preferred embodiment, each of the side-surface outer electrode 31 and the end-surface outer electrodes includes a base layer obtained by applying and firing a conductive paste containing metal powder and glass, for example.

For example, Cu, Ni, Ag, Pd, an Ag—Pd alloy, Au, or the like may be used as the metal constituting the base layer.

The thickness of the base layer is preferably about 10 μm to about 50 μm, for example.

For example, Cu, Ni, Ag, Pd, an Ag—Pd alloy, Au, or the like may be used as the metal constituting the plating layer.

The plating layer may preferably include a plurality of plating layers. The plating layer preferably has, for example, a two-layer structure including a Ni plating layer and a Sn plating layer.

The thickness of each layer of the plating layer is preferably about 1 μm to about 20 μm, for example, at its thickest portion.

The side-surface outer electrode 31, which serves as an electrode for ground in the laminated ceramic capacitor 50 according to the present preferred embodiment, is arranged so as to extend around the first, second, third and fourth side surfaces 11 to 14 of the ceramic element assembly 10.

The side-surface outer electrode 31 needs to be provided on at least the first and second side surfaces 11 and 12 of the ceramic element assembly 10 to which the first inner electrodes 21 are extended. The side-surface outer electrode 31 may not necessarily be provided so as to extend around the first, second, third and fourth side surfaces 11 to 14 of the ceramic element assembly 10. However, when the side-surface outer electrode 31 is provided so as to extend around the first, second, third and fourth side surfaces 11 to 14 of the ceramic element assembly 10, it is possible to obtain a laminated ceramic electronic component having no directivity in the side surfaces of the ceramic element assembly 10, and it is possible to handle the laminated ceramic electronic component without regard to its direction at a time of taping package or mounting, which is preferred.

In the laminated ceramic capacitor 50 according to the present preferred embodiment, as described above, the side-surface outer electrode 31 includes the first electrode portion A including the side-surface electrode portions A1 located on the first and second side surfaces 11 and 12 and the wrap-around electrode portions A2 arranged so as to extend around from the side-surface electrode portions A1 to the portions of the third and fourth side surfaces 13 and 14; and the second electrode portion B including the side-surface electrode portions B1 located on the third and fourth side surfaces 13 and 14 and the wrap-around electrode portions B2 arranged so as to extend around from the side-surface electrode portions B1 to the portions of the first and second side surfaces 11 and 12.

The wrap-around electrode portions B2 of the second electrode portion B are arranged so as to reach the regions covering the portions of the outermost inner electrodes 21a located at the outermost side portion among the plurality of first inner electrodes (side-surface extended inner electrodes) 21, which portions are exposed in the first and second side surfaces 11 and 12 of the ceramic element assembly 10, namely, such that the lengths of the wrap-around electrode portions B2 are larger than the thickness dimension of the outer layer portion 10a.

In other words, in the laminated ceramic capacitor 50 according to the present preferred embodiment, in the regions of the side-surface outer electrode 31 which cover the outermost inner electrodes 21a, the first electrode portion A and the second electrode portion B are arranged so as to overlap each other.

Each of the first electrode portion A and the second electrode portion B constituting the side-surface outer electrode is formed preferably by applying and firing a conductive paste; each of the regions of the side-surface outer electrode 31 which cover the outermost inner electrodes 21a preferably has a double-coating structure formed by firing the conductive paste for forming the first electrode portion A and the conductive paste for forming the second electrode portion B in a state where these conductive pastes are applied in an overlapped manner (see FIG. 5); and the side-surface outer electrode 31 is formed such that the thickness of the side-surface outer electrode 31 in each of the regions covering the outermost inner electrodes 21a preferably is not smaller than that of the thinnest portion of each of regions covering portions of the other first inner electrodes 21 which are exposed in the first and second side surfaces 11 and 12 of the ceramic element assembly 10 (regions other than the regions covering the exposed portions of the outermost inner electrodes 21a).

Figure 5:
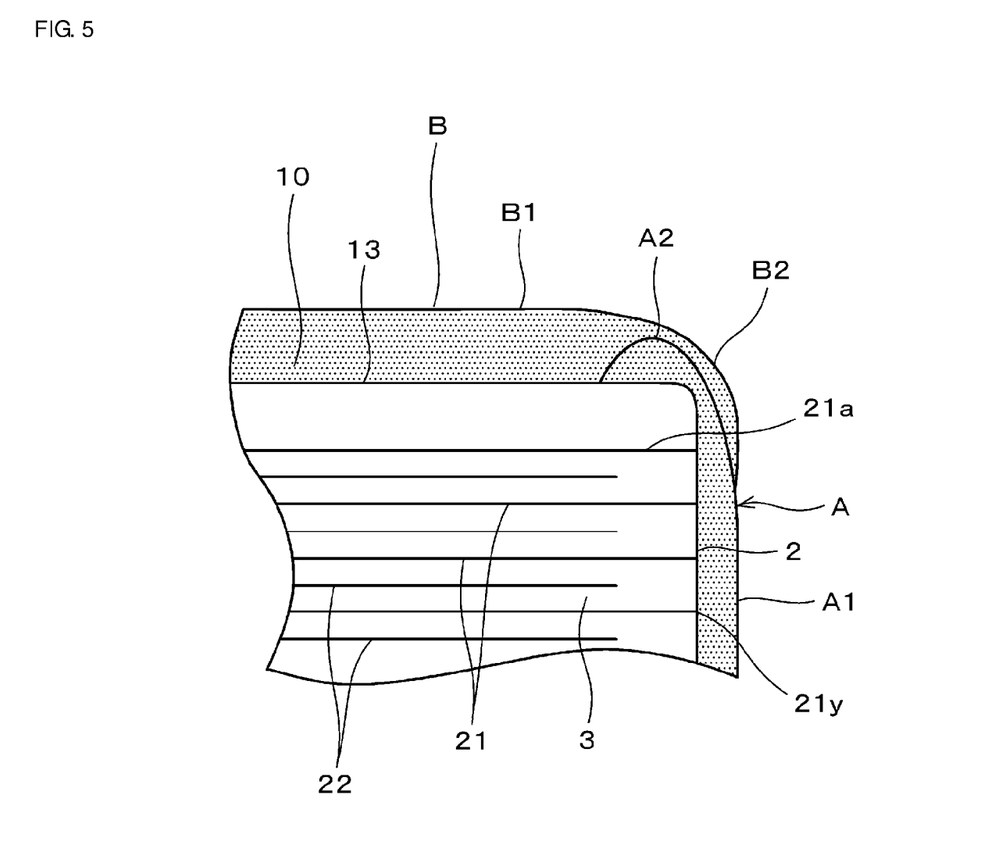
FIG. 5 is a cross-sectional view showing the configuration of a principal portion of the laminated ceramic capacitor according to a preferred embodiment of the present invention.

In other words, the regions covering the exposed portions of the outermost inner electrodes 21a are formed such that moisture resistance thereof is not inferior to that of the regions covering the exposed portions of the other first inner electrodes 21.

It should be noted that in FIG. 5, in order for it to be recognized that each of the regions of the side-surface outer electrode 31 which cover the outermost inner electrodes 21a includes a double-coating structure, this portion is illustrated so as to have a structure including two electrode layers, but it is thought that the interface between the two layers cannot be clearly recognized in some cases, depending on the firing conditions for the side-surface outer electrode 31.

Any of the first electrode portion A and the second electrode portion B may be on the lower side, but it is preferred that the first electrode portion A is on the lower side as described below.

Since the wrap-around electrode portions B2 of the second electrode portion B are located on the side-surface electrode portions A1 of the first electrode portion A, which includes the side-surface electrode portions A1 located on the first and second side surfaces 11 and 12 and the wrap-around electrode portions A2 arranged so as to extend around to the portions of the third and fourth side surfaces 13 and 14, the wrap-around electrode portions B2 of the second electrode portion B are arranged so as to reach the regions covering the portions of the outermost inner electrodes 21a which are exposed in the first and second side surfaces 11 and 12 in a state where the portions of the inner electrodes 21 which are exposed in the side surfaces of the ceramic element assembly 10 are integrally covered by the side-surface electrode portions A1 of the first electrode portion A. Thus, it is possible to more reliably cover the exposed regions of the inner electrodes. As a result, it is possible to obtain a laminated ceramic electronic component having higher moisture resistance reliability and high reliability of connection between the side-surface outer electrode and each inner electrode.

In the laminated ceramic capacitor 50 according to the present preferred embodiment, as described above, a sufficient thickness of a principal portion of the side-surface outer electrode 31 is ensured by providing a double-coating structure at an end portion where the thickness of each side-surface electrode portion A1 constituting the side-surface outer electrode 31 tends to be small (i.e., the regions covering the exposed portions of the outermost inner electrodes 21a) (see FIG. 5). Thus, it is possible to prevent or significantly reduce infiltration of water into the ceramic element assembly without excessively increasing the entire thickness of the outer electrode, and it is possible to enhance the moisture resistance reliability.

In the present preferred embodiment, the regions of the side-surface outer electrode 31 which cover the outermost inner electrodes 21a are arranged so as to have a double-coating structure, whereas the regions of the side-surface outer electrode 31 which cover the other inner electrodes 21 are not arranged so as to have a double-coating structure. By so doing, the entire thickness of the side-surface outer electrode 31 is increased, the necessity to reduce the dimension of the ceramic element assembly 10 in order to make the product dimension within a standard value is eliminated, and it is possible to provide a laminated ceramic electronic component having high flexibility in capacitance designing and high moisture resistance reliability.

In the laminated ceramic capacitor 50 according to the present preferred embodiment, the width (the dimension in the L direction) of the narrowest portion of each of the side-surface electrode portions A1, located on the first and second side surfaces 11 and 12 of the ceramic element assembly 10, of the first electrode portion A constituting the side-surface outer electrode 31 is preferably larger than the width of the narrowest portion of each of the side-surface electrode portions B1 located on the third and fourth side surfaces 13 and 14 of the ceramic element assembly 10 and constituting the second electrode portion B. When the width of the narrowest portion of each of the side-surface electrode portions A1 which function to cover the exposed portions of the first inner electrodes 21 of the ceramic element assembly 10 is larger than the width of the narrowest portion of each of the side-surface electrode portions B1 of the second electrode portion B as described above, it is possible to more reliably prevent or significantly reduce infiltration of water into the ceramic element assembly 10.

In the laminated ceramic capacitor 50 according to the present preferred embodiment, the thickness of the first electrode portion A constituting the side-surface outer electrode is preferably larger than the thickness of the second electrode portion B. When the thickness of the first electrode portion A is made larger, the thickness of the side-surface outer electrode 31 in the regions covering the outermost inner electrodes 21a (specifically, the side-surface electrode portions A1) is easily made larger, the width of the side-surface outer electrode 31 (specifically, the side-surface electrode portions A1) is easily made larger, and thus it is possible to further enhance the moisture resistance.

When the thickness of the second electrode portion B is made thinner than the first electrode portion A, the necessity to decrease the thickness of each outer layer portion 10a of the ceramic element assembly 10 in order to make the product dimension within a standard value is eliminated, and it is possible to ensure a sufficient thickness of each outer layer portion 10a and enhance the reliability.

The end-surface outer electrodes 41, which serve as electrodes for signal reception and transmission in the laminated ceramic capacitor 50 according to the present preferred embodiment, are located on the first and second end surfaces 1 and 2 of the ceramic element assembly 10.

It should be noted that each end-surface outer electrode 41 includes an end-surface electrode portion 41a and a wrap-around electrode portion 41b arranged so as to extend around the first to fourth side surfaces 11 to 14.

Next, a non-limiting example of a method for manufacturing the laminated ceramic capacitor according to another preferred embodiment of the present invention will be described.

Ceramic green sheets that are to be the ceramic layers, a conductive paste for inner electrode, and a conductive paste for outer electrode are prepared.

The ceramic green sheets, the conductive paste for inner electrode, and the conductive paste for outer electrode each contain a binder and a solvent, and a known binder and a known organic solvent may be used, for example.

Then, the conductive paste for inner electrode is printed on the ceramic green sheet in a predetermined pattern by a method such as screen printing, thereby forming an inner electrode pattern.

Then, a predetermined number of the ceramic green sheets on which various inner electrode patterns are formed as described above and a predetermined number of ceramic green sheets for outer later on which no inner electrode pattern is formed are laminated in a predetermined order, thereby producing a mother laminate.

Then, the mother laminate is pressed in the lamination direction by a method such as rubber press. The pressed mother laminate is cut into a predetermined size, thereby cutting out a green ceramic element assembly.

Then, the green ceramic element assembly is fired, thereby obtaining a ceramic element assembly. The firing temperature depends on the ceramic material and the inner electrode material but is generally preferably about 900° C. to 1300° C.

Next, the fired ceramic element assembly is polished, and the corners and the edges of the ceramic element assembly are rounded. A method such as barrel polishing may be used as the polishing method. By so doing, the ceramic element assembly 10 shown in FIG. 2 is obtained.

On the fired ceramic element assembly 10, (a base layer of) a side-surface outer electrode is formed. A typical example of the method for forming (the base layer of) the side-surface outer electrode is a method in which the conductive paste is applied and fired. It should be noted that there is no special constraint on a specific method in applying and firing the conductive paste, and it is possible to arbitrarily select and use an appropriate method from among various known methods.

For example, a method may be used in which, using an apparatus disclosed in Japanese Unexamined Patent Application Publication No. 2001-57311, a conductive paste stored in a paste tank is extruded and applied through slits formed in a slit plate.

In this case, in an application step for the first time, the conductive paste is applied to the entireties, in the lamination direction (T direction), of the first and second side surfaces (both left and right side surfaces) 11 and 12 of the ceramic element assembly 10 into a substantially strip shape. Then, in an application step for the second time, the conductive paste is applied to the entireties, in the width direction (W direction), of the third and fourth side surfaces (both upper and lower side surfaces) 13 and 14 of the ceramic element assembly 10 into a substantially strip shape. By so doing, it is possible to form the side-surface outer electrode 31 (FIG. 1) extending around the ceramic element assembly 10, and it is also possible to form the wrap-around electrode portions B2 (FIG. 1).

Alternatively, in an application step for the first time, the conductive paste is applied to the entireties, in the lamination direction (T direction), of the first and second side surfaces 11 and 12 of the ceramic element assembly 10 into a substantially strip shape. Then, in an application step for the second time, the conductive paste is extruded through slits processed such that the paste is not extruded from its center, whereby it is possible to apply the conductive paste only to both end sides, in the lamination direction (T direction), of the first and second side surfaces 11 and 12.

It is possible to change the lengths of the wrap-around electrode portions B2 by adjusting the amounts of the paste extruded through the slits.

In addition, a roller transfer method may be used in which a conductive paste retained on a roller having a groove, for conductive paste, formed on its circumferential surface is transferred and applied onto the surface of the ceramic element assembly (see, for example, paragraphs [0092] and [0093] of Japanese Unexamined Patent Application Publication No. 2012-28502 and Japanese Unexamined Patent Application Publication No. 2001-167989).

When such a roller transfer method is used, the ceramic element assembly 10 is retained by a retaining tool, the conductive paste is applied to the first and second side surfaces (both left and right side surfaces) 11 and 12 of the ceramic element assembly 10 as application for the first time, and formed conductive paste applied films are dried.

Then, the ceramic element assembly 10 is removed from the retaining tool, rotated 90 degrees (its direction is changed 90 degrees), and retained by the retaining tool again, and the conductive paste is applied to the third and fourth side surfaces (both upper and lower side surfaces) 13 and 14 of the ceramic element assembly 10 as application for the second time. By so doing, it is possible to form the side-surface outer electrode 31 (FIG. 1) extending around the ceramic element assembly 10 and form the wrap-around electrode portions B2.

It is possible to change the lengths of the wrap-around electrode portions B2 by adjusting a pressing force applied at a time of roller transfer.

It should be noted that when either application method is used, it is preferred that the conductive paste is initially applied to the first and second side surfaces 11 and 12 in which the inner electrodes 21 are exposed, as described above, but in some cases, it is possible to apply the conductive paste to the third and fourth side surfaces (both upper and lower side surfaces) 13 and 14 of the ceramic element assembly 10 for the first time and apply the conductive paste to the first and second side surfaces (both left and right side surfaces) 11 and 12 of the ceramic element assembly 10 for the second time.

In addition, in applying the conductive paste, in the case where the ceramic element assembly 10 has a substantially prism structure, prior to application of the conductive paste, the first and second side surfaces 11 and 12 are reliably detected by detecting whether the inner electrodes 21 are exposed, by using an optical device such as a camera, whereby it is possible to apply the conductive paste to a predetermined location.

Next, base layers of end-surface outer electrodes are formed on the end surfaces of the ceramic element assembly 10. In forming the base layers of the end-surface outer electrodes, conductive paste applied films for end-surface outer electrode are formed on both end surfaces of the ceramic element assembly 10.

Then, the conductive paste applied films formed thus for side-surface outer electrode and for end-surface outer electrode are fired. The firing temperature is generally preferably about 700° C. to 900° C.

By so doing, the base layer of the side-surface outer electrode and the base layers of the end-surface outer electrodes are formed.

Then, for example, plating treatment is conducted by a known method such as electroplating to form plating layers on each base layer. As the plating layer, a Ni plating layer and a Sn plating layer may be formed in order on each base layer.

In this manner, a laminated ceramic capacitor having the structure as shown in FIG. 1 is obtained.

Evaluation of Characteristics (1) Sample Subjected to Evaluation of Characteristics In order to evaluate characteristics of a produced laminated ceramic capacitor (sample), a three-terminal laminated ceramic capacitor that has the structure as shown in FIG. 1 and meets the following conditions (a sample of sample number 1 in Table 1) was prepared. In other words, the laminated ceramic capacitor is a laminated ceramic capacitor that includes the characteristics and features of a preferred embodiment of the present invention where the side-surface outer electrode 31 includes the first electrode portion A including the side-surface electrode portions A1 located on the first and second side surfaces 11 and 12 and the wrap-around electrode portions A2 arranged so as to extend around from the side-surface electrode portions A1 to the portions of third and fourth side surfaces 13 and 14 and the second electrode portion B including the side-surface electrode portions B1 located on the third and fourth side surfaces 13 and 14 and the wrap-around electrode portions B2 arranged so as to extend around from the side-surface electrode portions B1 to the portions of the first and second side surfaces 11 and 12; and the wrap-around electrode portions B2 of the second electrode portion B are arranged so as to reach the regions covering the portions of the outermost inner electrodes 21a located at the outermost side portion among the first inner electrodes 21, which portions are exposed in the first and second side surfaces 11 and 12 of the ceramic element assembly 10.

Conditions for Sample Number 1
(a) Product Dimension
  L: 1.0 mm, W: 0.5 mm, T: 0.5 mm
(b) Inner Electrode
  Thickness: 0.6 μm
  Number of inner electrodes (number of layers): 420
  First inner electrode (electrodes for ground): 210
  Second inner electrode (electrodes for signal): 210

(c) Thickness of Outer Layer Portion: 30 μm
(d) Thickness of Side-Surface Outer Electrode Covering Exposed Portions of Outermost Inner Electrodes: Shown in Table 1

In addition, for comparison, a laminated ceramic capacitor (a sample as a comparative example of sample number 2 in Table 1) in which a side-surface electrode is formed only on the first and second side surfaces 11 and 12 of the ceramic element assembly 10 was prepared. The laminated ceramic capacitor of this comparative example is a laminated ceramic capacitor in which the side-surface outer electrode covering portions exposed in the first and second side surfaces 11 and 12 of the ceramic element assembly 10 has a single-layer structure and are thin and which does not meet the requirements of the present invention.

(2) Evaluation Method
(a) Thickness of Side-Surface Outer Electrode

A WT surface (end surface) of each sample was polished until the first inner electrodes extended to the first and second side surfaces were exposed. Then, the "thickness of the side-surface outer electrode" in the region covering the portion of each outermost inner electrode which is exposed in the first and second side surfaces of the ceramic element assembly, on the polished cross-section, was measured with a digital microscope (VHX-100 manufactured by KEYENCE CORPORATION). The measurement was conducted for each of five samples and the "thickness of the side-surface outer electrode" in the region was measured at four locations. The total number of data was sample number 5×measurement locations 4=20.

The minimum value of "the thickness of the side-surface outer electrode" and the average of the "thickness of the side-surface outer electrode" which was calculated from the above data are shown in Table 1.

(b) Moisture Resistance Reliability

Each sample was mounted on a test substrate (substrate thickness: 1.6 mm, a single-layer substrate) and placed in a test bath. EHS-211MD manufactured by ESPEC Corp. was used as the test bath, and AMI-150-S-25 manufactured by ESPEC Corp. was used for voltage application/resistance measurement.

The test conditions were 85° C./85%/4 V/1000 hr, and a moisture resistance reliability test was conducted for 18 samples.

When the resistance at the end of the test was decreased from the value at the beginning of the test by a single digit or more in Log IR, the resistance was regarded as defective.

The number of occurrence of resistance defect is also shown in Table 1.

TABLE 1

| Sample number | Manner in which side-surface outer electrode is provided | Thickness of side-surface outer electrode Minimum value (μm) | Thickness of side-surface outer electrode Average (μm) | Number of occurrence of resistance defect in moisture resistance reliability test Number of defects/Number of samples |
|---|---|---|---|---|
| 1 (Example) | Provided so as to extend around the first to fourth side surfaces | 5.19 | 10.35 | 0/18 |

TABLE 1-continued

| Sample number | Manner in which side-surface outer electrode is provided | Thickness of side-surface outer electrode | | Number of occurrence of resistance defect in moisture resistance reliability test |
|---|---|---|---|---|
| | | Minimum value (μm) | Average (μm) | Number of defects/Number of samples |
| 2 (Comparative Example) | Provided only on first and second side surfaces | 1.57 | 5.09 | 18/18 |

(c) Width of Side-Surface Outer Electrode

For the sample of sample number 1 in Table 1, the width of the narrowest portion of each of the side-surface electrode portions A1, located on the first and second side surfaces 11 and 12, of the first electrode portion A constituting the side-surface outer electrode 31 and the narrowest portion of each of the side-surface electrode portions B1 of the second electrode portion B located on the third and fourth side surfaces 13 and 14, were measured. The measurement was conducted with a metallographical microscope (MM-60 manufactured by Nikon Corporation).

The measurement was conducted for five samples and at each of the first and second side surfaces 11 and 12 or each of the third and fourth side surfaces 13 and 14 of each sample. The total number of data was sample number 5×measurement locations 2=10.

The minimum value of the width of the narrowest portion and the average of the width of the narrowest portion which was calculated from the above data are shown in Table 2.

TABLE 2

| Side surface of ceramic element assembly | Width of side-surface outer electrode | |
|---|---|---|
| | Minimum value (mm) | Average (mm) |
| First side surface and second side surface | 0.224 | 0.240 |
| Third side surface and fourth side surface | 0.193 | 0.209 |

(3) Evaluation Result

As shown in Table 1, in the case of the sample of sample number 1 which includes the features and characteristics of a preferred embodiment of the present invention, with regard to the "thickness of the side-surface outer electrode" in the region covering the exposed portion of each outermost inner electrode, the average value and the minimum value are 10.35 μm and 5.19 μm, respectively, and are sufficiently higher than those of the sample 2 of the comparative example which does not include the features and characteristics of a preferred embodiment of the present invention, namely, an average value of 5.09 μm and a minimum value of 1.57 μm. In addition, it is confirmed that occurrence of resistance decrease in the moisture resistance reliability test was not observed. It should be noted that in the sample of the comparative example of sample number 2, the occurrence of a resistance defect was observed in all of the 18 samples.

In addition, with regard to the relationship between the width of the narrowest portion of each of the side-surface electrode portions A1 located on the first and second side surfaces 11 and 12 and the width of the narrowest portion of each of the side-surface electrode portions B1 located on the third and fourth side surfaces 13 and 14 in the sample of sample number 1 which includes all of the features and characteristics of a preferred embodiment of the present invention, it is confirmed that the former is higher in both the minimum value of the width of the narrowest portion and the average value of the width of the narrowest portion, as shown in Table 2.

As presented above, when the width of the narrowest portion of each of the side-surface electrode portions A1 located on the first and second side surfaces (the left and right side surfaces) 11 and 12 in which the inner electrodes 21 are exposed is made larger than that of each of the side-surface electrode portions B1 located on the third and fourth side surfaces (the upper and lower side surfaces) 13 and 14, it is possible to enhance the moisture resistance reliability, which is preferred.

The above preferred embodiments have been described with, as an example, the three-terminal laminated ceramic capacitor from which the advantageous effects of the present invention are expected most. However, in the present invention, the type of the laminated ceramic electronic component is not limited thereto, and preferred embodiments of the present invention are applicable to various laminated ceramic electronic components including a substantially strip-shaped side-surface outer electrode.

For example, preferred embodiments of the present invention are also applicable to a laminated ceramic electronic component including inner electrodes extended to side surfaces but having no inner electrodes extended to end surfaces.

In addition, preferred embodiments of the present invention are also applicable to a laminated ceramic electronic component including a plurality of substantially strip-shaped side-surface external electrodes, such as a multilayer capacitor array.

Furthermore, the present invention is not limited to the above preferred embodiments in other aspects, and with regard to the number of, the dimensions of, and the shapes of the ceramic layers or the inner electrodes constituting the ceramic element assembly, various applications and modification may be made within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A laminated ceramic electronic component comprising:
   a ceramic element assembly including a plurality of laminated ceramic layers and including first and second end surfaces opposed to each other, first and second side surfaces which connect the first and second end surfaces and are opposed to each other, and third and fourth side surfaces which connect the first and second end surfaces and are opposed to each other;
   a plurality of inner electrodes provided within the ceramic element assembly and extended to the first and second side surfaces; and
   a strip-shaped side-surface outer electrode located on the first, second, third and fourth side surfaces of the ceramic element assembly so as to extend around the ceramic element assembly and connected to the inner electrodes extended to the first and second side surfaces; wherein the side-surface outer electrode extending around the ceramic element assembly includes a first electrode portion including side-surface electrode portions located on the first and second side surfaces of the ceramic element assembly and wrap-around electrode portions arranged so as to extend around from the side-surface electrode portions of the first electrode portion to portions of the third and fourth side surfaces, and a second electrode portion including side-surface electrode portions located on the third and fourth side surfaces and wrap-around electrode portions arranged so as to extend around from the side-surface electrode portions of the second electrode portion to portions of the first and second side surfaces;

the wrap-around electrode portions of the second electrode portion reach regions covering portions of outermost inner electrodes located at an outermost side portion among the inner electrodes, the portions of the outermost inner electrodes located at the outermost side portion among the inner electrodes are exposed at the first and second side surfaces of the ceramic element assembly;

the first electrode portion located on the first side surface and the first electrode portion located on the second side surface are not directly connected to each other; and the first electrode portion located on the first side surface and the first electrode portion located on the second side surface are electrically connected to one another on the ceramic element assembly via the second electrode portion which is interposed between the first electrode portion located on the first side surface and the first electrode portion located on the second side surface on the ceramic element assembly.

2. The laminated ceramic electronic component according to claim 1, wherein the wrap-around electrode portions of the second electrode portion are located on the side-surface electrode portions of the first electrode portion.

3. The laminated ceramic electronic component according to claim 1, wherein a width of a narrowest portion of the side-surface outer electrode on the first and second side surfaces of the ceramic element assembly is larger than a width of a narrowest portion of the side-surface outer electrode on the third and fourth side surfaces of the ceramic element assembly.

4. The laminated ceramic electronic component according to claim 1, wherein the ceramic element assembly has a quadrangular prism shape in which each of the first and second end surfaces is a square.

5. The laminated ceramic electronic component according to claim 1, further comprising:

a plurality of inner electrodes provided within the ceramic element assembly and extended to the first and second end surfaces, in addition to the inner electrodes extended to the first and second side surfaces; and end-surface outer electrodes located on the first and second end surfaces of the ceramic element assembly and connected to the inner electrodes extended to the first and second end surfaces, in addition to the side-surface outer electrode.

* * * * *